US008654936B1

(12) United States Patent
Eslambolchi et al.

(10) Patent No.: US 8,654,936 B1
(45) Date of Patent: Feb. 18, 2014

(54) HOME CONTROL, MONITORING AND COMMUNICATION SYSTEM USING REMOTE VOICE COMMANDS

(75) Inventors: Hossein Eslambolchi, Los Altos Hills, CA (US); Kaveh Hushyar, Saratoga, CA (US); Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1049 days.

(21) Appl. No.: 11/065,944

(22) Filed: Feb. 24, 2005

Related U.S. Application Data

(60) Provisional application No. 60/547,189, filed on Feb. 24, 2004.

(51) Int. Cl.
    *H04M 1/64* (2006.01)
(52) U.S. Cl.
    USPC ..................... 379/88.04; 379/88.23
(58) Field of Classification Search
    USPC .......................... 379/102.03, 88.04
    See application file for complete search history.

(56) References Cited

U.S. PATENT DOCUMENTS

| | | | |
|---|---|---|---|
| 5,671,267 A | 9/1997 | August et al. | |
| 5,799,067 A * | 8/1998 | Kikinis et al. | 379/93.06 |
| 5,909,183 A | 6/1999 | Borgstahl et al. | |
| 6,021,324 A * | 2/2000 | Sizer et al. | 455/403 |
| 6,058,104 A | 5/2000 | Snelling et al. | |
| 6,061,430 A | 5/2000 | Miller et al. | |
| 6,404,761 B1 | 6/2002 | Snelling et al. | |
| 6,507,762 B1 | 1/2003 | Amro et al. | |
| 6,510,212 B2 * | 1/2003 | Ito et al. | 379/102.03 |
| 6,535,110 B1 * | 3/2003 | Arora et al. | 340/310.11 |
| 6,584,439 B1 * | 6/2003 | Geilhufe et al. | 704/270 |
| 6,594,258 B1 | 7/2003 | Larson et al. | |
| 6,693,999 B2 | 2/2004 | Ito et al. | |
| 6,744,865 B2 | 6/2004 | Lahutsky | |
| 6,792,323 B2 * | 9/2004 | Krzyzanowski et al. | 700/90 |
| 6,839,345 B2 | 1/2005 | Lu et al. | |
| 6,844,807 B2 | 1/2005 | Inoue et al. | |
| 7,138,927 B2 * | 11/2006 | Fang et al. | 340/825.69 |
| 7,158,871 B1 * | 1/2007 | Ilan et al. | 701/49 |
| 7,353,280 B2 * | 4/2008 | Chiles et al. | 709/228 |
| 2001/0044321 A1 * | 11/2001 | Ausems et al. | 455/556 |
| 2002/0007278 A1 * | 1/2002 | Traynor | 704/275 |

(Continued)

OTHER PUBLICATIONS

Intel—White Paper, Broadband Wireless Access, "IEEE 802.16 and Wimax", 2003 Intel Corporation.

*Primary Examiner* — Joseph T Phan
(74) *Attorney, Agent, or Firm* — Scott P. Zimmerman, PLLC

(57) ABSTRACT

A voice-activated command interface module for interacting with a plurality of home-based electronic devices so as to allow for a remotely-located home owner to communicate with, command and control various ones of the electronic devices. The module includes a plurality of communication ports, each communication port associated with a different type of communication interface for providing communications to and from the plurality of electronic devices. The module also includes a voice network communication port for receiving the voice commands from the home owner and a data network communication port for transmitting monitoring and control information between the plurality of electronic devices and the home owner. In operation, the command interface module is responsive to voice commands received from a remote user via an incoming telephone line (either data or voice). A voice recognition unit within the command interface module is utilized to translate the received voice signal into an "action/control" signal and then perform the desired activity.

8 Claims, 2 Drawing Sheets

(56) References Cited

U.S. PATENT DOCUMENTS

2003/0076240 A1* 4/2003 Bae et al. ............... 340/825.72
2004/0003073 A1 1/2004 Krzyzanowski et al.
2004/0117038 A1 6/2004 Karaoguz et al.
2005/0035855 A1 2/2005 Sarnowsky

* cited by examiner

HOME CONTROL, MONITORING AND COMMUNICATION SYSTEM USING REMOTE VOICE COMMANDS

CROSS-REFERENCE TO RELATED APPLICATION

The present application claims the benefit of U.S. Provisional Application No. 60/547,189, filed Feb. 24, 2004.

TECHNICAL FIELD

The present invention relates to a system for allowing a remote user to maintain in contact with various appliances/devices in his home and, more particularly, to the utilization of a single command interface device within the home to provide a communication link between a remote user, his home and other individuals.

BACKGROUND OF THE INVENTION

The dawn of the information age has revealed new and exciting opportunities for computer processing capabilities. Personal computers have been deployed in a variety of arenas to gain efficiencies, reduce cost, and increase productivity. Miniaturization and portability have made personal computers more accessible and a more valued tool in many business environments. Personal computers have also become a very useful tool in non-business environments, including educational institutions and homes.

Home computer networks are gaining increased popularity. Within a home, multiple personal computers can be connected together to permit a user to share files without having to carry a physical copy of the media from room to room. The computer network also permits the users to share printers, fax machines, and other devices. Internet access facilities can also be provided to permit access to external networks and services. Thus, a user can operation a home computer to gain instant access to information from virtually anywhere in the world.

Within the past few years, the "home computer network" has begun to evolve into more generally a "home network", where the personal computer(s) are also connected to various other home appliances/devices, such as a security system, messaging system, heating/lighting, and the like. Using such a "home network", it is now possible to allow a first home device control and/or communicate with various other home devices. In a preferred arrangement, it is desirable to allow for a remote user/home owner to contact and control various home devices. In most home networks, a "home server" is used to facilitate this type of remote communication. The home server may receive a remote command from the home owner via a telephone line between the home and a network (such as the Internet or the public-switched telephone network—PSTN). Some of the home servers may have a display connected thereto illustrating the "state" of the various devices under control, allowing the home owner to glance at the server (when he is home) and assess the status of the home devices. However, the remote aspects of this prior art type of home server are rather limited.

Recently, systems have appeared in motor vehicles that allow an occupant of a vehicle to initiate commands that are transmitted to the occupant's home to activate devices that are networked together in the home. For example, one system integrates a virtual advisor service to provide an interface for the occupant to control systems within the home, such as lighting, climate, and home security systems. The interface uses a personal calling service with voice recognition technology. Such systems, however, rely on a third party as an intermediary to receive the occupant's requests and transfer the requests to the home network.

Certain other prior art systems utilize multiple push buttons in a vehicle to control networked home devices. In such systems, each button is dedicated to a specific command. Other systems implement touch screens in a display to initiate commands. All of these approaches, however, distract a driver since the driver has to locate the appropriate button in the vehicle or has to scroll through multiple screens in the display to issue the commands.

While some of these latter systems represent an advance in the state of the art, the limitations in terms of vehicular use and need for a third party intermediary need to be addressed in order for home monitoring and control to become a more commonplace aspect of today's communication capabilities.

SUMMARY OF THE INVENTION

The need remaining in the prior art is addressed by the present invention, which relates to a system for allowing a remote user to maintain in contact with various appliances/devices in his home and, more particularly, to the utilization of a single command interface module within the home to provide a communication link between a remote user, his home and other individuals.

In accordance with the present invention, the command interface module is configured to include communication interfaces with various home appliances/devices. The command interface module further includes the capability to control these devices (i.e., turn certain devices "off" or "on", modify settings on devices, provide dial tone to remote home owner, etc.). A selected number of "user policies", in terms of controlling/activating the devices, are stored in a policy database within the command interface module. A history log database of past activities may also be stored within the command interface module.

In operation, the command interface module is responsive to voice commands received from a remote user via an incoming telephone line (either data or voice). A voice recognition unit within the command interface module is utilized to translate the received voice signal into an "action/control" signal and then perform the desired activity.

It is an aspect of the present invention that the command interface module functions as an interface between the voice and data communication networks. For example, a remote home owner may call home, and request that the command interface module send an email to an identified party. The command interface module will recognize the command ("email"), the "identified party", and the following (spoken) message. The command interface module would then engage the home owner's computer to create the email message and transmit the message over the data network.

It is further possible to utilize the command interface module of the present invention to remotely monitor the status of various home appliances (i.e., HV/AC systems, alarm/security systems, etc.), and send "commands" to modify one or more of these appliances, as desired. As along as an interface is in place between the appliance and the command interface module, the appliance can be controlled by voice commands from the home owner (through a telephone connection) while he is at a remote location.

Other and further aspects and capabilities of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
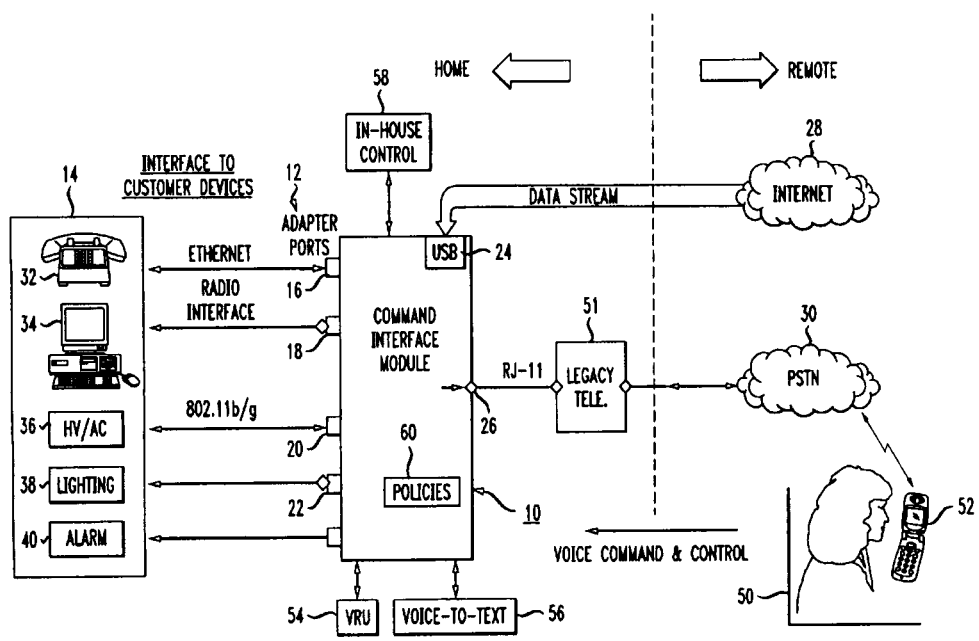
FIG. 1 contains a simplified block diagram illustrating the implementation of a command interface module in accordance with the present invention.

FIG. 1 illustrates, in simplified block diagram form, an exemplary home arrangement utilizing a command interface module 10 formed in accordance with the present invention. As will be discussed in detail below, command interface module 10 comprises a plurality of different internal communication ports 12, a separate port for communicating with one or more home appliances/devices 14 (hereinafter simply referred to as "home devices") for which monitoring and control is desired. Communication ports 12 may include, for example, an Ethernet port 16, a radio communication port 18, an 802.11 port 20, and an alarm port 22. A pair of external communication ports 24 (USB connection) and 26 (RJ-11 connection) are used to communicate with the "outside world" via a data network 28 and PSTN 30, respectively.

The home devices in communication with command interface module 10 may include, for example, a telephone 32, a computer 34, HV/AC system control 36, lighting system 38, home alarm system 40, etc. Various different types of connections may be used to provide the communication link between the proper communication port 12 and home device 14. For example, in a wireless communication environment, a connection to 802.11 port 20 may be appropriate for home computer 34. A connection to radio port 18 may be appropriate for alarm system 40, etc. The purposes of the present invention are not particularly based on the specific connections between the various home devices 14 and command interface module 10, as long as the communication link is capable of supporting two-way communication with the capabilities of collecting "status" information/operational data from home devices 14 and issuing "commands" to home devices 14. Indeed, it is a significant aspect of the present invention that command interface module 10 is capable of communicating utilizing various communication standards with a wide variety of different devices. This ability allows for a home owner with relatively weak computer/technology skills to access and use the control/monitoring system of the present invention.

In operation, a home owner is capable of monitoring and controlling various home devices 14 while being remotely located with respect to the home by virtue of using voice commands to access command interface module 10. Referring to FIG. 1, a remote home owner is illustrated as being at a remote location 50, and uses a communication device 52 (such as a cellular phone) to call into his home through PSTN 30 and legacy phone device 51, where legacy phone device 51 is coupled through RJ-11 connection 26 to command interface module 10. For example, the home owner may call home and request that an email be sent to a particular person. The call home may include a first command that allows the home owner to gain access to command interface module 10 (for example, the utterance "access" may be recognized by a voice recognition unit (VRU) 54 in command interface module 10 to activate the two-way interaction between the home owner and module 10. Once module 10 has been accessed, the home owner can then send the voice command "send email to Bob Smith", where this command is recognized by VRU 54 and used to activate personal computer 34 and find Bob Smith's email address. The home owner can then dictate the text of the email message, where a voice-to-text conversion unit 56 within module 10 is used to convert the speech input into text suitable for transmission as email. The message is then transmitted, and (perhaps) module 10 transmits a reply "email sent" to the remotely-located home owner as confirmation.

In its monitoring aspect, a home owner may again "access" command interface module 10, and request the status of any controlled device 14 within the home. For example, a home owner call module 10 and utter a voice command to "turn the lights on". In this case, module 10 will recognize the "lights on" command (using VRU 54), and activate the various lights controlled through a microprocessor-based in-house control unit 58 within module 10. The status of alarm system 40 may similarly be monitored by a remotely-located home owner. Indeed, should there be break-in or other event occur that triggers an actual "alarm" condition, interface control module 10 may be configured, using a set of user policies 60 stored within interface control module 10, to immediately call the home owner's cell number—such as the number of device 52—(in addition to calling the proper emergency personnel). In a larger sense, user policies 60 may comprise a database of various conditions that are specifically programmed by the home owner to control various ones of home devices 14. The policies may utilize time-sensitive information (time-of-day, day-of-week, etc.) to turn up/down thermostat settings, turn on/off sprinkler systems, lights, etc., while allowing real-time voice commands from a remote home owner to override the pre-established policies when necessary.

Figure 2:
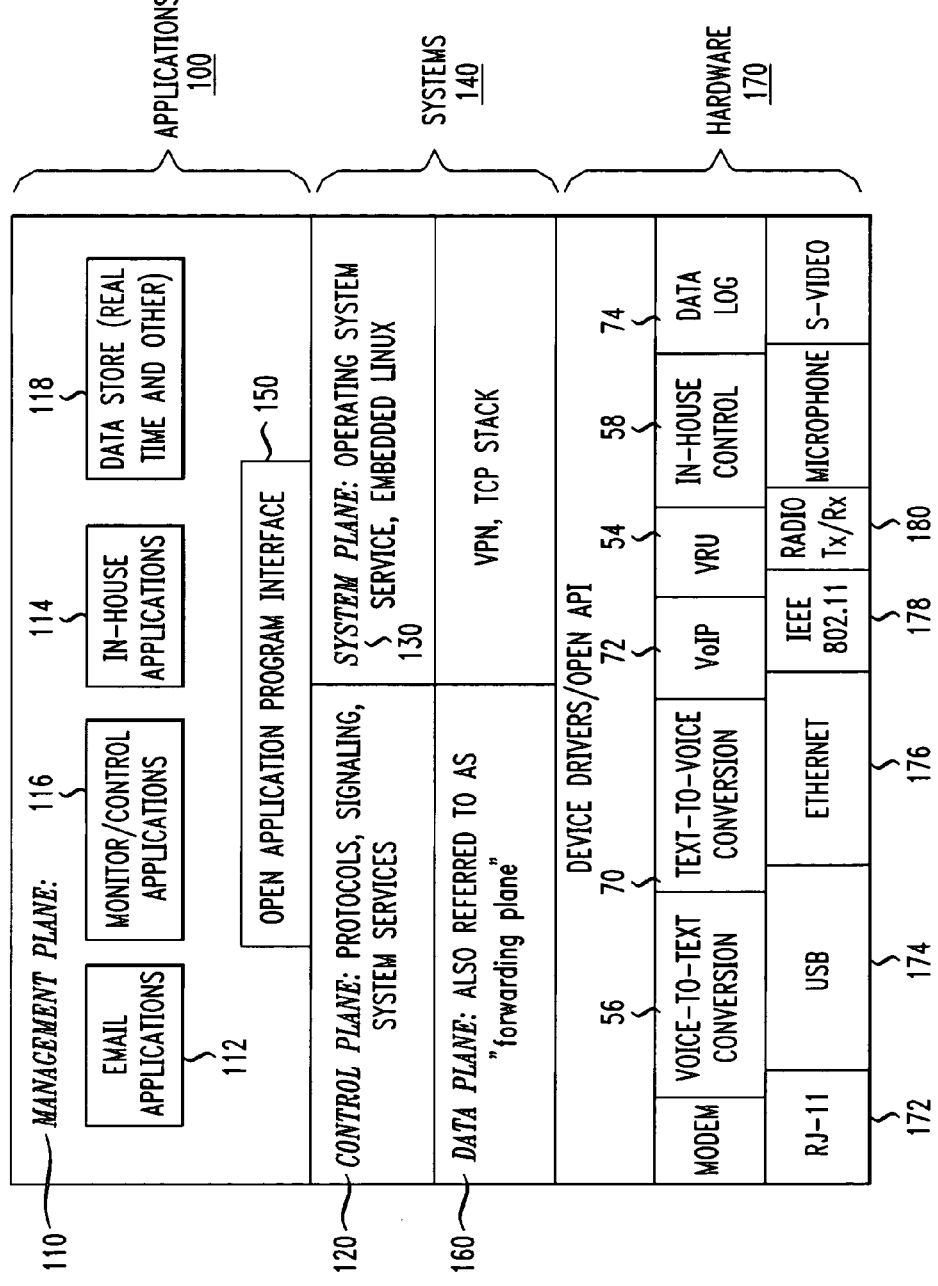
FIG. 2 illustrates an exemplary architectural diagram of the various communication levels within a command interface module formed in accordance with the present invention.

FIG. 2 contains an exemplary diagram of a layered software architecture associated with the deployment of the command interface command module arrangement of the present invention. The architecture is broken down into three levels: "applications", "system" and "hardware", illustrating the locations of the various architectural planes within these three layers. As shown, with "applications" defined as top layer 100, a management plane 110 is shown and comprises a collection of the various subsystems and modules that are required to carry out the various "remote control" commands that may be submitted by a home owner. In the exemplary arrangement as shown in FIG. 2, management plane 110 is illustrated as including an email applications module 112, an in-house applications module 114, a monitor/control applications module 116 and a data storage module 118.

A control plane 120 and a system plane 130 are illustrated as located within system/middle layer 140. An open Application Program Interface (API) module 150 is utilized to provide communication between management plane 110 and control and system planes 120 and 130. Control plane 120 is defined as the collection of subsystems involved with signaling and routing of "slow path" data within command interface module 10. System plane 130 is essentially a collection of the various conventional services required to operate in the "background" to implement the functionality of interface command module 10, such as an operating system, file system, etc. An appropriate communication method, such VPN or a TCP stack, may be included with system plane 130. Beyond this, the particulars of system plane 130 are not contemplated as being germane to the subject matter of the present invention.

A data plane 160 is also contained within system/middle layer 140 and is responsible for all communication data path processing within module 10. In particular, the data communications includes the physical interface processing for all external interfaces, logical interface processing for all data protocol layers, status and statistics handling, end-point (Service Access Point) support, cross-connect handling for all connection-oriented end-points, forwarding/routing handling for all connectionless end-points, data access to end-points (i.e., application access to "source" or "sink" data), and Quality of Service (QoS) support.

The hardware level 170 consists of various modules that are required to implement communication ports 12, 24 and 26, as described hereinabove in association with FIG. 1. In the particular example as illustrated in FIG. 2, hardware level 170 is illustrated as including an RJ-11 module 172, a USB module 174, an Ethernet module 176, an 802.11 module 178, a radio communication module 180, and so on. Also illustrated within hardware level 170 are the subsystems of command interface module 10 as discussed above. In particular, voice-to-text conversion unit 56, VRU 54 and in-house control unit 58. Also illustrated in hardware level 170 is a "text-to-voice" conversion unit 70 that operates to convert an incoming email (for example) into a voice message that may be transmitted to a remote home owner. A voice-over-IP (VoIP) unit 72 is included and may be accessed via a "dial tone" voice command from a remote homeowner. A data history log 74 is included and may be used to store information related to past activities of module 10.

In accordance with these teachings of the present invention, therefore, it is possible to configure an interface command module that can easily interact with the existing voice and data networks, providing a "seamless" connection between a remote home owner and a variety of different appliances/devices. By virtue of using existing technologies such as voice recognition in combination with the emerging wireless home device technology, a home owner will be able to stay "in touch" with home from virtually any where in the world.

A method and system has been disclosed for remotely controlling various home appliances/devices via voice command, such as through a cellular telephone. Although the present invention has been described in accordance with the embodiments as shown, one of ordinary skill in the art will readily recognize that there could be variations to the embodiments and those variations are considered to fall within the spirit and scope of the present invention. Accordingly, many modifications may be made by one of ordinary skill in the art without departing from the spirit and scope of the claims as appended hereto.

What is claimed is:

1. A method for remotely controlling a plurality of electronic devices located within a home, the method comprising:
    receiving a voice telephone call over a public-switched telephone network at a home-based command interface unit, the voice telephone call being made by a remotely-located user;
    receiving, at the home-based command interface unit, a voice command from the remotely-located user during the voice telephone call to the home-based command interface unit;
    evaluating the voice command at the home-based command interface unit to ascertain authenticity of the remotely-located user and to determine an action requested by the voice command; and, if authenticated, causing the home-based command interface to interact with at least one of the plurality of electronic devices to carry out the voice command from the remotely-located user.

2. The method of claim 1, wherein the method further comprising transmitting a confirmation message from the home-based command interface unit to the remotely-located user during the voice telephone call upon completion of requested actions.

3. The method of claim 1, further comprising upon receipt of the voice command, accessing a set of user policies stored within the home-based command interface unit.

4. The method of claim 3, wherein the set of user policies comprises a database of operational conditions for the plurality of electronic devices.

5. The method of claim 1, further comprising storing the voice command in a history log within the home-based command interface unit.

6. An apparatus for remotely controlling a plurality of electronic devices located within a home, the apparatus comprising:
    a processor; and
    storage storing programming that when executed causes the processor to perform operations, the operations comprising:
    receiving a voice telephone call over a public-switched telephone network at a home-based command interface unit, the voice telephone call including a voice command;
    evaluating the voice command at the home-based command interface unit to ascertain authenticity of a remotely-located user and determining an action requested by the voice command; and
    interface for interacting the home-based command interface unit with one of the plurality of electronic devices to carry out the voice command from the remotely-located user.

7. The apparatus of claim 6, wherein the operations further comprise transmitting a confirmation message from the home-based command interface unit to the remotely-located user during the voice telephone call upon completion of requested actions.

8. The apparatus of claim 6, wherein the operations further comprise storing a history log within the home-based command interface unit for completed voice commands.

* * * * *